United States Patent
Hanley

(10) Patent No.: US 7,716,744 B2
(45) Date of Patent: May 11, 2010

(54) APPARATUS AND METHOD FOR MONITORING AND CONTROLLING ACCESS TO DATA ON A COMPUTER READABLE MEDIUM

(75) Inventor: Mark Hanley, Reading (GB)

(73) Assignee: Macrovision Corporation, Santa Clara, CA (US)

( * ) Notice: Subject to any disclaimer, the term of this patent is extended or adjusted under 35 U.S.C. 154(b) by 934 days.

(21) Appl. No.: 11/501,627

(22) Filed: Aug. 9, 2006

(65) Prior Publication Data

US 2007/0079095 A1 Apr. 5, 2007

Related U.S. Application Data

(63) Continuation-in-part of application No. 11/232,477, filed on Sep. 21, 2005.

(51) Int. Cl.
  *G06F 17/30* (2006.01)
(52) U.S. Cl. .......................................... 726/26; 726/27
(58) Field of Classification Search ............. 726/26–27, 726/30
See application file for complete search history.

(56) References Cited

U.S. PATENT DOCUMENTS

| 5,379,433 | A | * | 1/1995 | Yamagishi | .................... | 726/30 |
|---|---|---|---|---|---|---|
| 5,418,852 | A | * | 5/1995 | Itami et al. | .................... | 705/57 |
| 5,805,800 | A | | 9/1998 | Kotani et al. | | |
| 6,172,664 | B1 | * | 1/2001 | Nakasuji et al. | ................ | 726/26 |
| 2003/0105717 | A1 | * | 6/2003 | Kim et al. | .................... | 705/50 |
| 2004/0103301 | A1 | | 5/2004 | Inokuchi et al. | | |
| 2004/0168075 | A1 | * | 8/2004 | Suh et al. | .................... | 713/193 |
| 2005/0055314 | A1 | * | 3/2005 | Ebihara et al. | ................ | 705/57 |
| 2005/0172122 | A1 | | 8/2005 | Risan et al. | | |
| 2005/0185926 | A1 | | 8/2005 | Basile et al. | | |
| 2005/0259546 | A1 | | 11/2005 | Basile et al. | | |
| 2007/0036356 | A1 | | 2/2007 | Holzapfel et al. | | |

FOREIGN PATENT DOCUMENTS

EP 1 528 557 A1 5/2005
WO WO 01/46952 A2 6/2001

OTHER PUBLICATIONS

International Search Report for PCT/GB2006/003463 mailed Jan. 4, 2007, 2 pages.
DECSS Central : "More about DeCSS "[Online] Sep. 14, 2005, XP002410468, INET, Retrieved from the Internet : URL :http://www.lemuria.org/DeCSS/decss.html> [retrieved on Dec. 6, 2006], 3 pages.

* cited by examiner

*Primary Examiner*—Ponnoreay Pich
(74) *Attorney, Agent, or Firm*—Victor H. Okumoto; Andy T. Pho

(57) ABSTRACT

The present invention provides a device driver and a method for controlling access to data on a computer readable medium. According to the invention, there is provided an interface for access to a device-driver stack for a media drive, a detector for detecting insertion of a computer readable medium in said media drive, and a monitor for monitoring accessing of data on said computer readable medium. A control device establishes a location of at least one demonstration zone on said computer readable medium and determines whether a data region currently being accessed is in said demonstration zone. Said control device modifies playback of data in dependence upon the outcome of said determination.

26 Claims, 19 Drawing Sheets

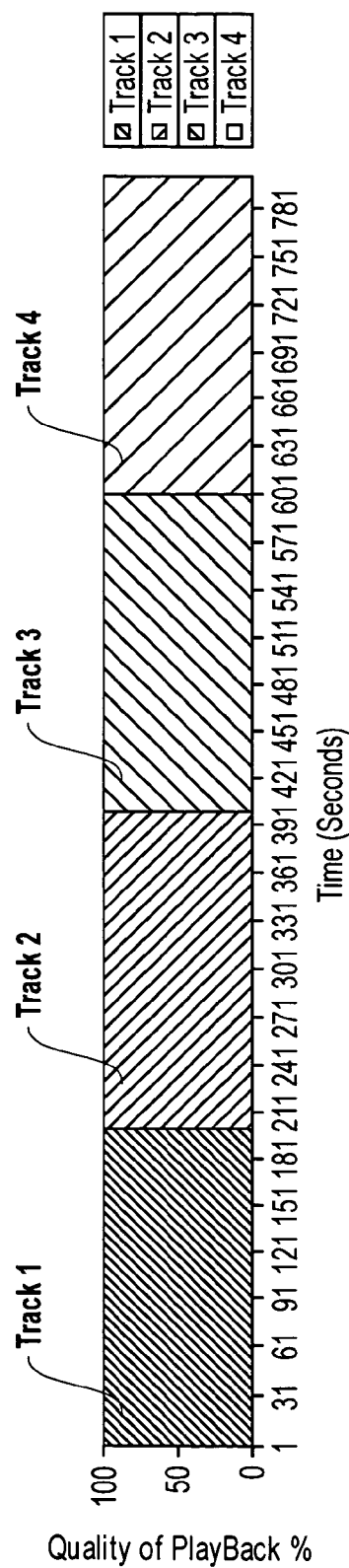
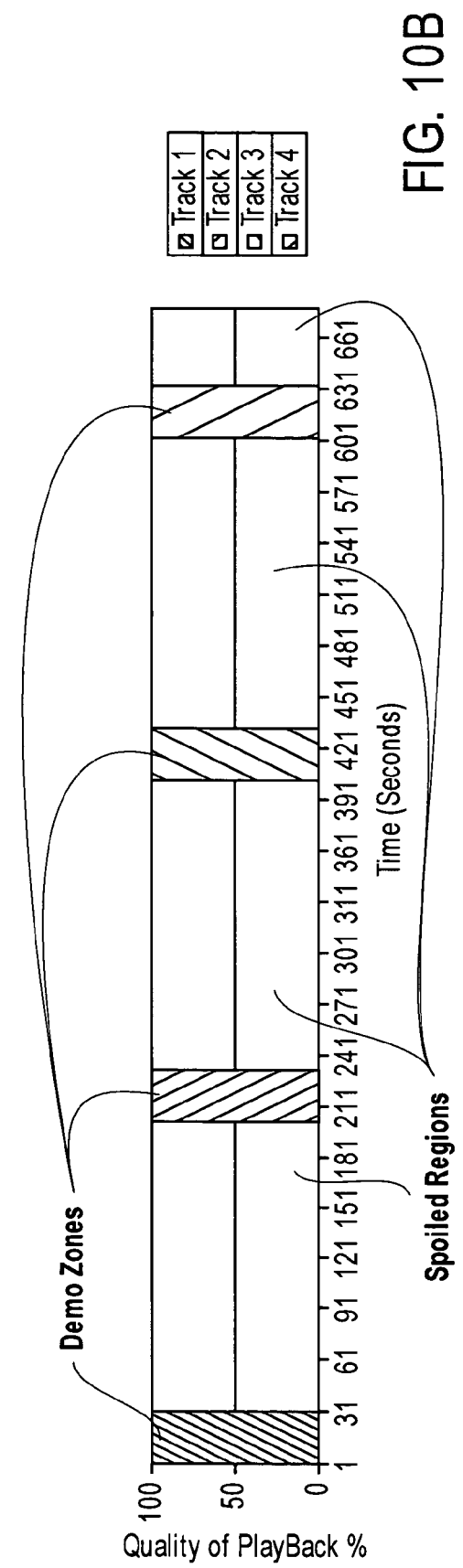
FIG. 10A
FIG. 10B

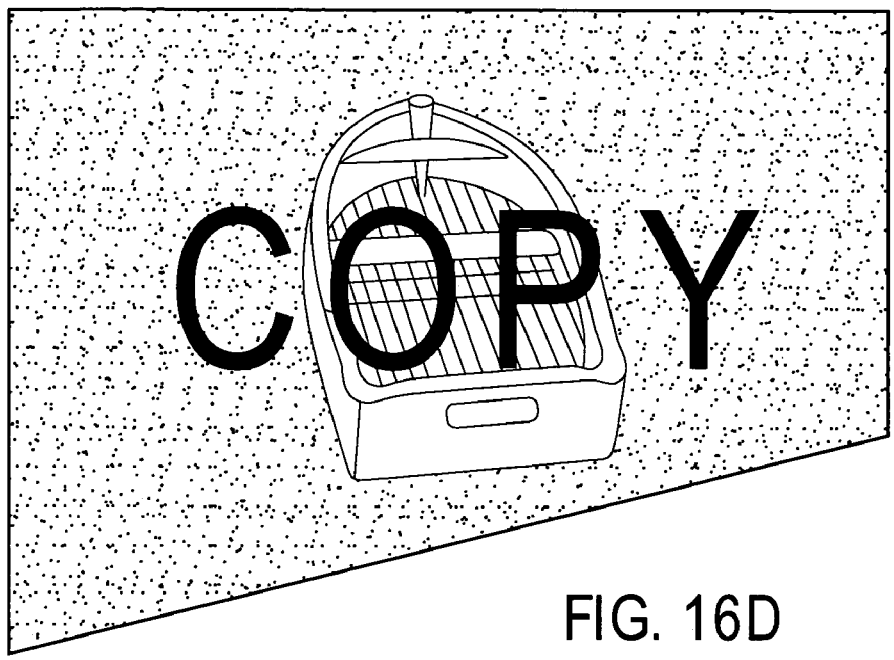
FIG. 16D
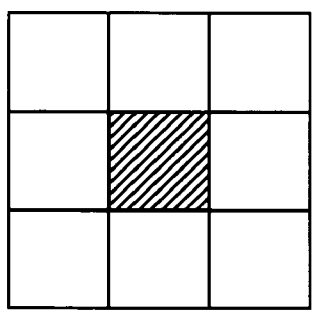 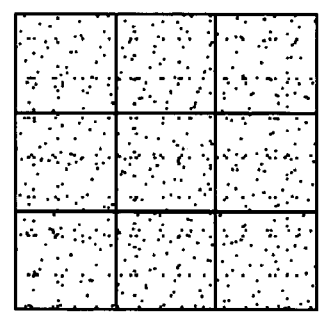
FIG. 17A
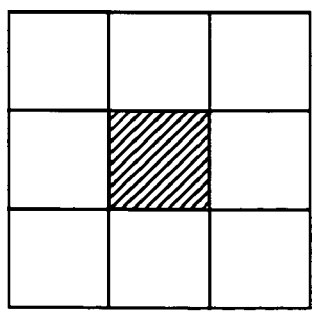 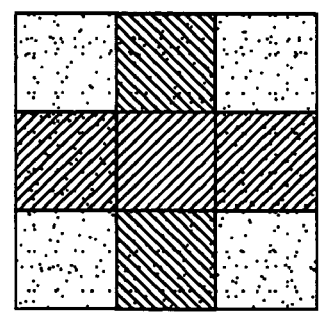
FIG. 17B

APPARATUS AND METHOD FOR MONITORING AND CONTROLLING ACCESS TO DATA ON A COMPUTER READABLE MEDIUM This application is a continuation-in-part of U.S. Ser. No. 11/232,477 filed Sep. 21, 2005.

FIELD OF THE INVENTION

The invention concerns apparatus and a method for monitoring and controlling access to data on a computer readable medium, and is particularly applicable to the protection of a data carrying medium against unauthorized copying whilst providing limited access for evaluation or promotional purposes.

1. Related Application

The present application is a development of the invention described in our co-pending U.S. patent application Ser. No. 11/232,477, the contents of which are incorporated herein by reference.

2. Background to the Invention

Techniques for protecting computer readable media, such as optical discs including CDs and DVDs, against unauthorized copying have been known for some while. Two such methods of protection are described in our earlier U.S. patent application Ser. No. 10/848,879 and U.S. Ser. No. 10/939,186.

U.S. Ser. No. 10/848,879 discloses a method of protection in which redundant control data, including errors, is included amongst the data carried by an optical disc. The control data controls access to content files on the optical disc, containing material or content data to be played, and the redundant control data is not utilized during normal playback of the content. However, during unauthorized copying, the redundant control data is accessed and the errors in such data are arranged to frustrate navigation of at least one program path providing access to the content data.

U.S. Ser. No. 10/939,186 discloses a method of protection in which at least one region containing unreadable or subversive data is provided within the content data on an optical disc. Control data on the disc for accessing content files containing the content data ensures that access to the region of unreadable or subversive data is prevented during normal playback. However, in the event of unauthorized copying, the region of unreadable or subversive data is accessed and hinders or prevents copying.

The methods according to these two earlier US patent applications are both passive, in the sense that they rely on data incorporated in the optical disc for protecting the disc against a procedure known as "ripping", i.e. unauthorized copying onto a hard drive of a local computer or network.

Such passive techniques are effective to some extent in protecting against unauthorized copying. However, ripping software is becoming increasingly sophisticated and powerful and increasingly effective in overcoming such passive forms of protection.

The invention of U.S. Ser. No. 11/232,477 was designed to provide a more effective form of protection against unauthorized copying, which would be harder to circumvent. According to U.S. Ser. No. 11/232,477, means are provided for authenticating an instance of use of a computer readable medium, in order to verify that the use of the medium is legitimate, as in normal playback, and to prohibit unauthorized use of the medium, such as ripping. Further, such means are in the form of an active process installed on the computer, as opposed to passive data provided on the computer readable medium.

More especially, according to U.S. Ser. No. 11/232,477, there is provided a device driver for monitoring and controlling access to data on a computer readable medium, comprising: a hook driver for hooking into a device-driver stack for a media drive; a detector for detecting the insertion of a computer readable medium in said media drive; a monitor for monitoring data transfer from said computer readable medium and for evaluating a behaviour characteristic of an application reading data on said computer readable medium; and a control system responsive to said monitor for issuing at least one control output when said behaviour characteristic fulfills predetermined criteria.

According to U.S. Ser. No. 11/232,477, there is also provided a method for monitoring and controlling access to data on a computer readable medium, comprising: accessing a device-driver stack for a media drive; detecting the insertion of a computer readable medium in the media drive; monitoring data transfer from the computer readable medium; on the basis of the monitored data transfer evaluating a behaviour characteristic of an application reading data on the computer readable medium; and issuing at least one control output when the behaviour characteristic fulfills predetermined criteria.

The evaluation is intended to distinguish between players who are accessing data on the computer readable medium for legitimately playing the main content, and rippers who are accessing the data for the purpose of illegitimately copying the same. In such circumstances, the control output serves respectively to permit or prohibit further access to the computer readable medium for further copying.

Such a technique for protecting data on a computer readable medium against unauthorized use may be thought of as active, in the sense that it relies on monitoring and controlling use of the medium in real time.

SUMMARY OF THE INVENTION

The present invention is a development of the invention of U.S. Ser. No. 11/232,477, which also relies on the active protection of data on a computer readable medium, such as a CD-ROM or DVD, in order to prevent unauthorized use, and which nevertheless permits limited playback for the purposes, for example, of evaluation of the main content or access to specific regions of the medium.

According to a first aspect of the invention, there is provided a device driver for controlling access to data on a computer readable medium, comprising:

an interface for access to a device-driver stack for a media drive;

a detector for detecting insertion of a computer readable medium in said media drive;

a monitor for monitoring accessing of data on said computer readable medium; and a control device for establishing a location of at least one demonstration zone on said computer readable medium and for determining whether a data region currently being accessed is in said demonstration zone, said control device modifying playback of data in dependence upon the outcome of said determination.

According to a second aspect of the invention, there is provided a method for controlling access to data on a computer readable medium, comprising:

accessing a device-driver stack for a media drive;

detecting insertion of a computer readable medium in said media drive;

monitoring accessing of data on said computer readable medium;

establishing a location of at least one demonstration zone on said computer readable medium;

determining whether a data region currently being accessed is in said demonstration zone; and modifying playback of data in dependence upon the outcome of said determination.

According to the invention, at least in the preferred embodiments described below, the control device is effectively switched on and off in dependence upon the outcome of the determination as to whether the data region currently being accessed is in the demonstration zone or not.

In these preferred embodiments of the invention, the control device is arranged to spoil playback in the event that the data region of the computer readable medium being accessed is not in the demonstration zone.

For example, the data may be randomly scrambled, or a spoiler track may be combined with the data, in the event that the computer readable medium is a CD-ROM. Alternatively, in the event that the computer readable medium is a DVD, a pixilation algorithm or a blurring algorithm may be applied to the current video frame.

BRIEF DESCRIPTION OF THE DRAWINGS

The invention is described further, by way of example only, with reference to the accompanying drawings, in which:

FIGS. 10a to 10d are diagrams representing four audio tracks on a CD-ROM when played normally and when selectively blocked or spoiled according to the present invention;

FIGS. 16a to 16d are diagrams representing respectively a video image displayed normally and when selectively spoiled according to the present invention; and FIGS. 17a and 17b are diagrams representing algorithms applied in the case of the spoiling techniques of FIGS. 16b and 16c respectively.

DETAILED DESCRIPTION OF PREFERRED EMBODIMENTS

Figure 1:
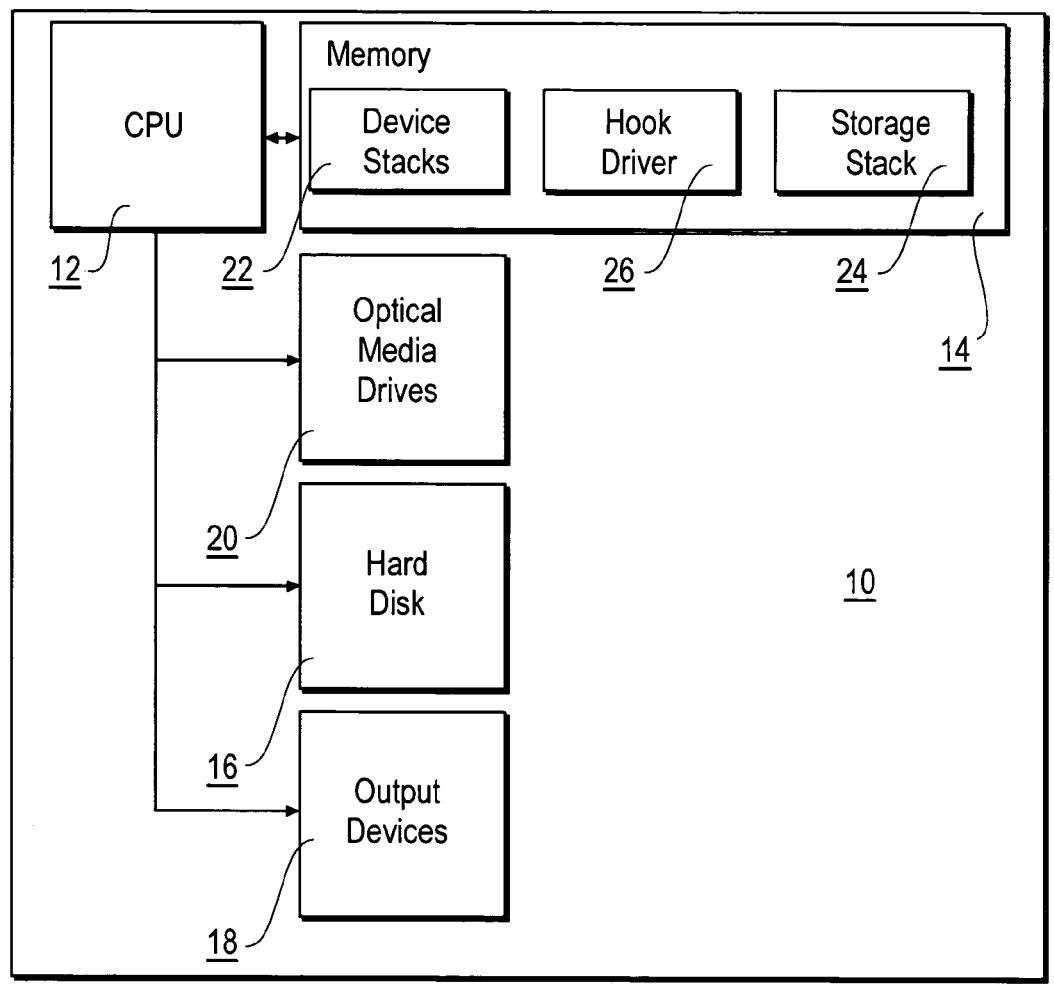
FIG. 1 is a block diagram of a computer incorporating the present invention.

The invention will now be described with reference to a number of preferred embodiments illustrated in the drawings. The invention may be employed in a personal computer, a computer system comprising a local area network (LAN) or a computer network comprising a wide area network (WAN), such as the Internet. The principles are the same in each case, and therefore only the application of the invention in a personal computer will be described. Such an application is illustrated in FIGS. 1 to 3, which illustrate the basic hardware employed in the present invention and the corresponding architecture.

Figure 2:
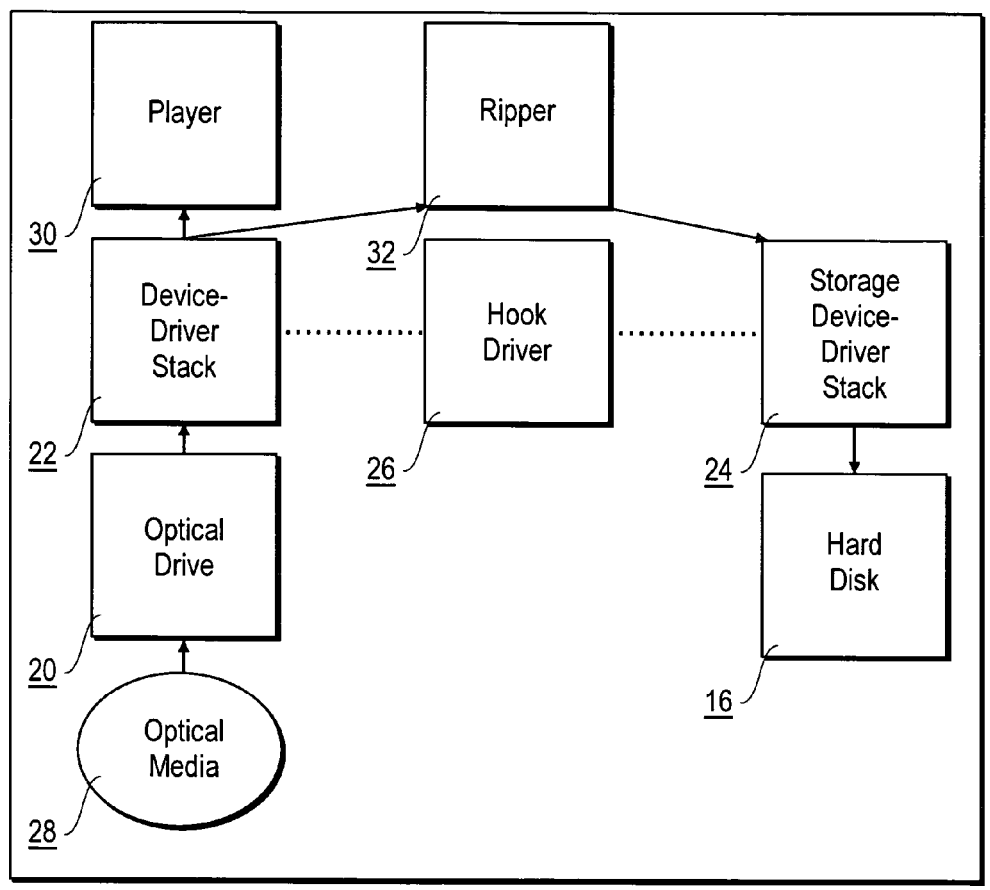
FIG. 2 is a block diagram showing further details of the computer of FIG. 1.

Referring initially to FIGS. 1 and 2, which show the basic apparatus, a personal computer 10 includes a central processing unit (CPU) 12, a memory 14, and a hard disk 16, as well as at least one output device 18, such as a speaker system or display. The computer 10 also includes at least one media drive 20 for a computer readable medium such as an optical disc, for example a CD-ROM or a DVD. In the preferred embodiment of the invention described herein, the computer 10 includes plural output devices 18 in the form of a speaker system and a display, and plural media drives 20 for each of a CD-ROM and a DVD. Stored in the memory 14 is the application software for providing instructions to the CPU 12 for a variety of functions. In particular, a first such function 22 comprises a number of device driver stacks respectively for controlling reading and writing with respect to a computer readable medium, for example an optical disc, loaded in one of the media drives 20. A second function 24 is a storage device driver stack for controlling reading and writing in relation to the hard disk 16 of the computer 10. In addition, a further function 26 is stored in the memory 14, which comprises an active device driver according to the invention. This device driver 26 is termed a 'hook driver' herein because, in use, it hooks into one of the device driver stacks 22 and/or the storage device driver stack 24 in order to perform a monitoring and controlling function as will be described below.

The hook driver 26 detects when an optical disc 28 is inserted into a respective one of the optical drives 20, and thereafter monitors the use of the optical disc 28. In particular, the hook driver 26 monitors data transfer in relation to the optical disc 28 and/or the manner in which the optical disc 28 is accessed, in order to determine whether the data on the disc is the subject of normal playback by a play application 30 or unauthorized copying by a ripping application 32. During normal playback, the information is read from the optical disc 28 by the player 30 by way of the device driver stack 22 for output by way of the speakers and/or display 18. During ripping, however, data read from the optical disc 28 is copied by means of the ripper 32 and is transferred by means of the storage device driver stack 24 to the local hard disk 16. On detection of ripping by the ripper 32, the hook driver 26 takes steps to prohibit access by the ripper 32 to the optical disc 28 and/or to prevent further copying of data from the optical disc 28 as described in U.S. Ser. No. 11/232,477. In accordance with the present invention, the hook driver 26 also provides a further possibility when ripping is detected, namely the hook driver 26 takes steps to provide limited playback for evaluation purposes.

Figure 3:
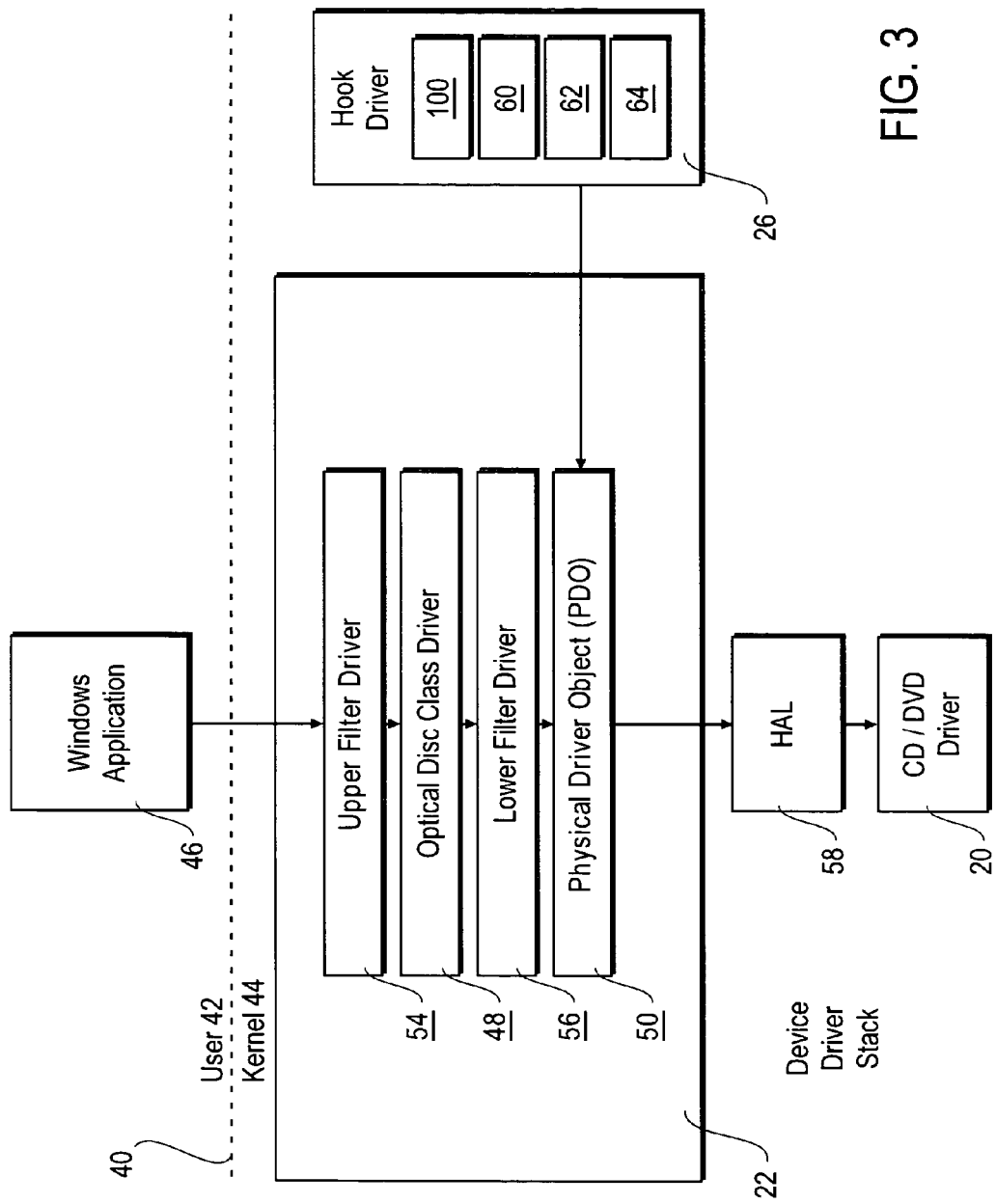
FIG. 3 is a diagram of a device driver stack and a hook driver according to the present invention.

FIG. 3 shows details of a respective device driver stack 22 and the connection between the hook driver 26 and the device driver stack 22. As shown in FIG. 3, the device driver stack 22 is situated at an interface 40 between a user mode 42 of the computer 10 and a kernel mode 44. The user mode 42 handles high level activities, such as the implementation of applications in the computer, including for example a Windows application 46, the play application 30 or other applications required by the computer user. The kernel mode 44 handles low level activities, such as the scheduling of tasks, and interfacing with drivers etc.

The interface 40 is known as a small computer system interface (SCSI) and serves for example to connect hardware, such as a respective optical drive 20, by way of the associated device driver stack 22 to the CPU 12 within the computer 10. Requests, known as SCSI requests, from the Windows or other application 46 to the optical drive 20 are transmitted across the interface 40 and through a series of layers in the device driver stack 22, which increasingly convert the requests from a high level software language to instructions applicable to the physical hardware in the form of the optical drive 20, for implementation at the optical drive 20. Completed SCSI requests are then transmitted in the reverse direction through the device driver stack 22 and across the interface 40 to the Windows application 46 for processing in the CPU 12.

As shown in FIG. 3, the device driver stack 22 comprises a series of drivers, including an optical disc class driver 48, and a physical device object 50 for converting the instructions from the driver 48 into signals for application to the optical drive 20. The hook driver 26 hooks into the physical device object 50 at the lowest access point of the device driver stack 22, in other words at the level of the device driver stack 22 which interfaces with the hardware comprising the optical drive 20. The driver 48 is located between upper and lower filter drivers 54, 56 respectively. The lower filter driver 56 is connected to the physical device object 50, which applies requests to the optical drive 20 by way of a hardware abstraction layer (HAL) 58. The HAL 58 serves for abstracting hardware signals from the requests received from the physical device object 50 and applying them to the optical drive 20 and for converting signals received from the optical drive 20 into completed requests for transmission back to the physical device object 50.

The hook driver 26, which as stated is hooked in to the physical device object 50 of the device driver stack 22, includes a hook manager 60 for effecting the connection between the hook driver 26 and the physical device object 50, a fingerprint reader 62, and an authentication object 64. In accordance with the present invention, the hook driver 26 also includes a control device 100 for switching on and off a blocking or spoiling function of the hook driver 26, in dependence upon receipt of a detection signal from the authentication object 64 indicating that copying is occurring. Further details of the hook manager 60, the fingerprint reader 62, the authentication object 64 and the control device 100 will now be described with reference to FIGS. 4 to 9 and 11 to 15, which show flowcharts representing the steps performed by each of these devices.

Figure 4:
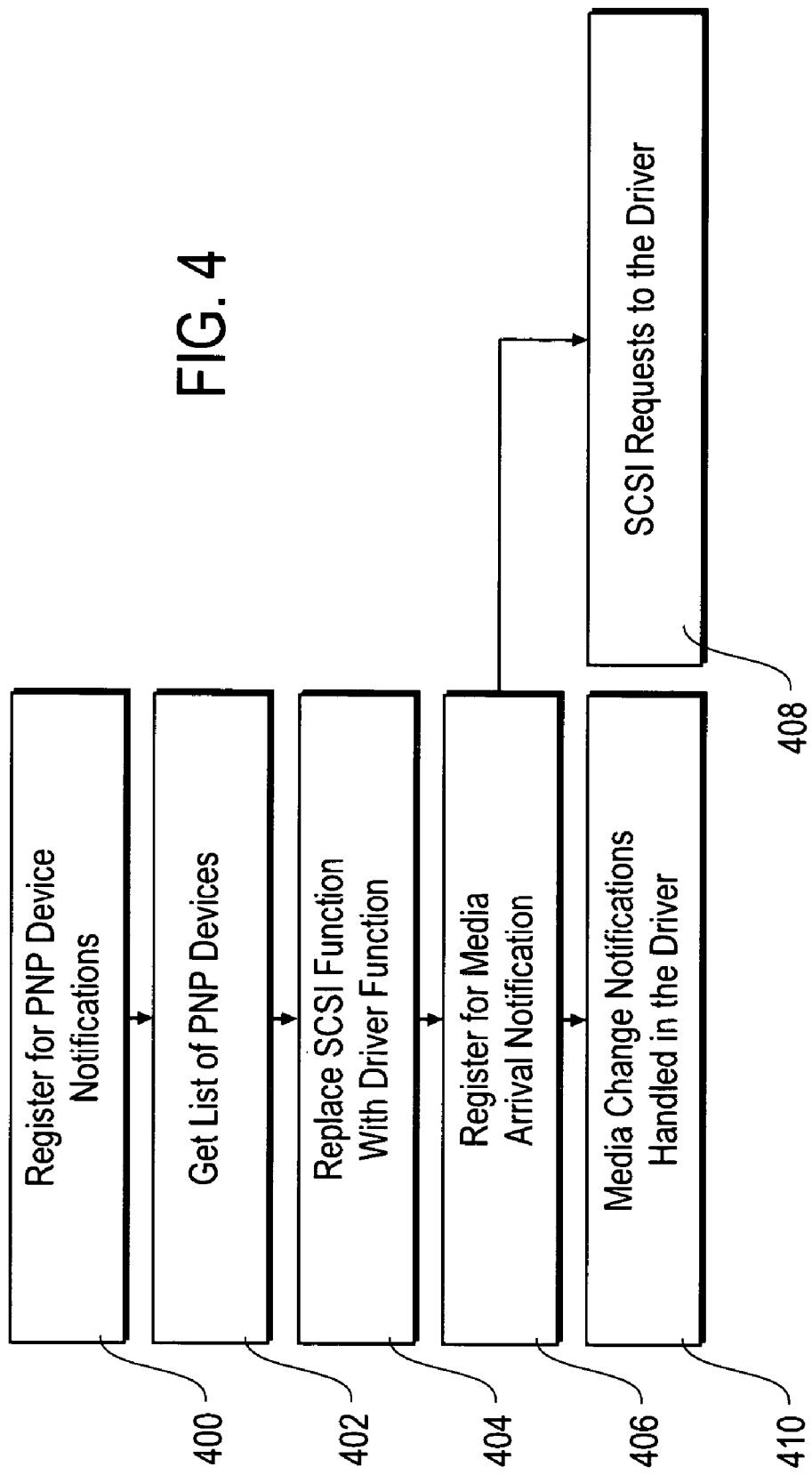
FIG. 4 is a flowchart showing the steps of a hook manager for the hook driver for hooking the hook driver into the device driver stack.

FIG. 4 is a flowchart representing the operations of the hook manager 60, which are as follows. In step 400, the hook driver 26 accesses the physical device object 50 of the storage device driver stack 24 of the computer 10 and registers itself for receiving notifications of plug and play (PNP) devices incorporated within the computer 10 or connected to the computer 10 as peripherals. Such PNP devices include the optical drives 20. Next, in step 402, the hook driver 26 requests from the operating system of the computer 10, and obtains, a list of such devices currently present, including the optical drives 20. Thereafter, the request for notification of PNP devices in step 402 remains active, and as further devices are connected into the computer 10 the IDs for such devices will be supplied to the hook driver 26.

Having obtained the current list of PNP devices in step 402, the hook driver 26 in step 404 substitutes in each device driver stack 22 its own function for the normal SCSI function provided by the physical device object 50 of that stack 22, so that future SCSI requests will pass through the hook driver 26. In addition, in step 406, the hook driver 26 registers itself with the application 46 for receiving notification of media arrivals, i.e. an indication that an optical disc 28 has been inserted into one of the optical drives 20. Such notification includes the location of the relevant optical drive 20 and the kind of optical disc 28, i.e. CD-ROM or DVD, which has been inserted. All future SCSI requests for supply to the relevant optical drive 20 will now be directed through the hook driver 26 as shown in step 408. Media change notifications are also handled by the hook driver 26 as indicated by step 410. The installation of the hook driver 26 is thus complete.

Figure 5:
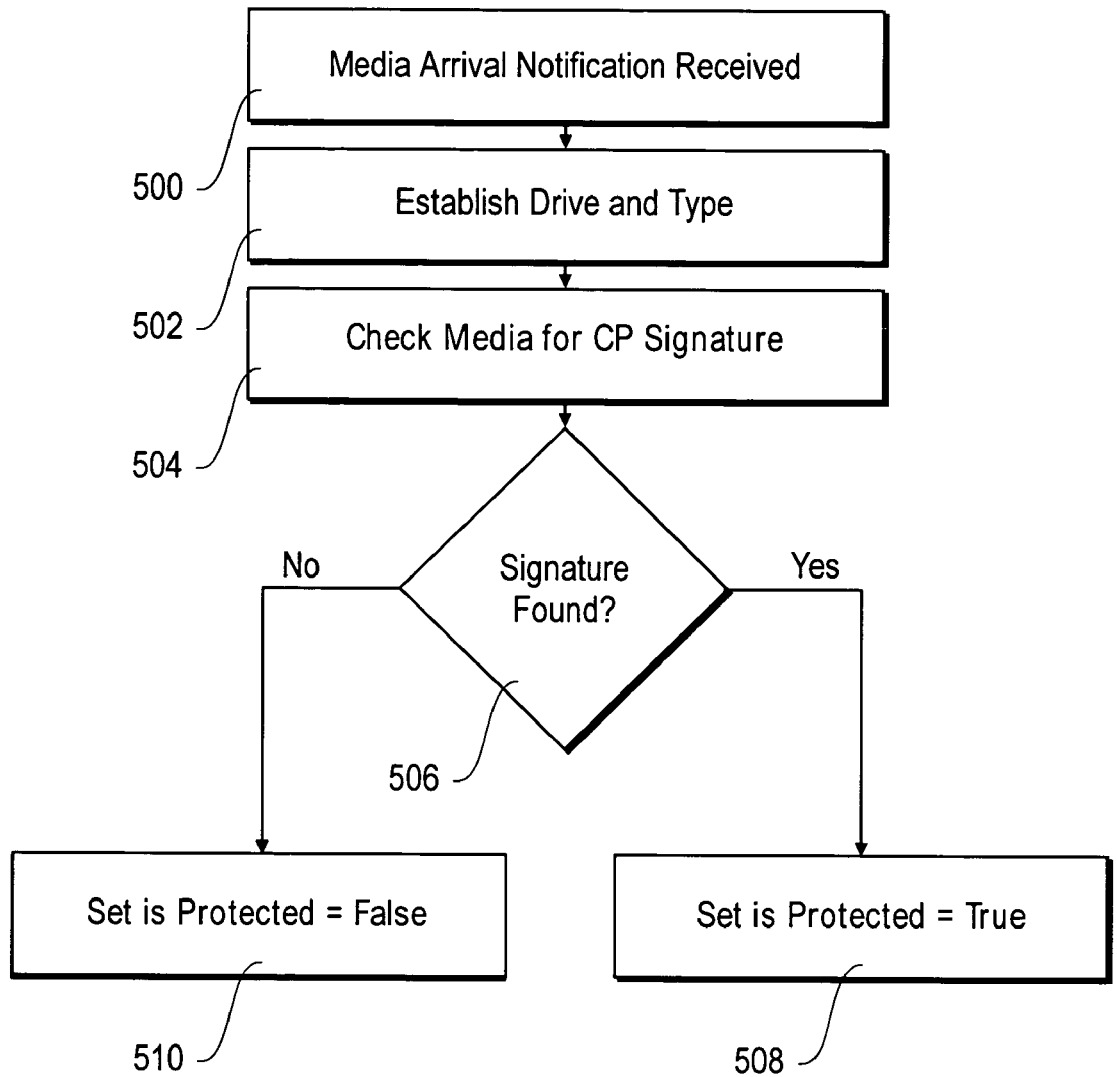
FIG. 5 is a flowchart showing the steps of a fingerprint reader of the hook driver for reading a fingerprint on an optical disc inserted into a media drive of the computer.

FIG. 5 shows details of the steps involved in the sub-routine 410 in FIG. 4, which are performed by the fingerprint reader 62 of the hook driver 26 shown in FIG. 3. When a new optical disc 28 is inserted in one of the optical drives 20, the hook driver 26 receives a notification of the media arrival in step 500 and establishes in step 502 which optical drive 20 contains the optical disc 28 and what type of disc 28, i.e. CD-ROM or DVD, has been inserted. Next, the hook driver 26 checks the optical disc 28 for a content protection (CP) signature or fingerprint in step 504. The hook driver 26 enquires in step 506 whether a fingerprint has been found and, if the answer is yes, sets a flag "Is protected" to true in step 508. If the answer to the inquiry of step 506 is no, the hook driver sets the flag to "false" in step 510.

The steps which now follow are performed by the authentication object 64 and control device 100 of the hook driver 26 shown in FIG. 3 and depend on whether the optical disc 28 that has been inserted is a CD-ROM bearing an audio track or a DVD bearing a video track. The situation for a CD-ROM bearing an audio track will be described first with reference to FIGS. 6 to 9; and that for a DVD bearing a video track will be described next with reference to FIGS. 11 to 15.

Figure 6:
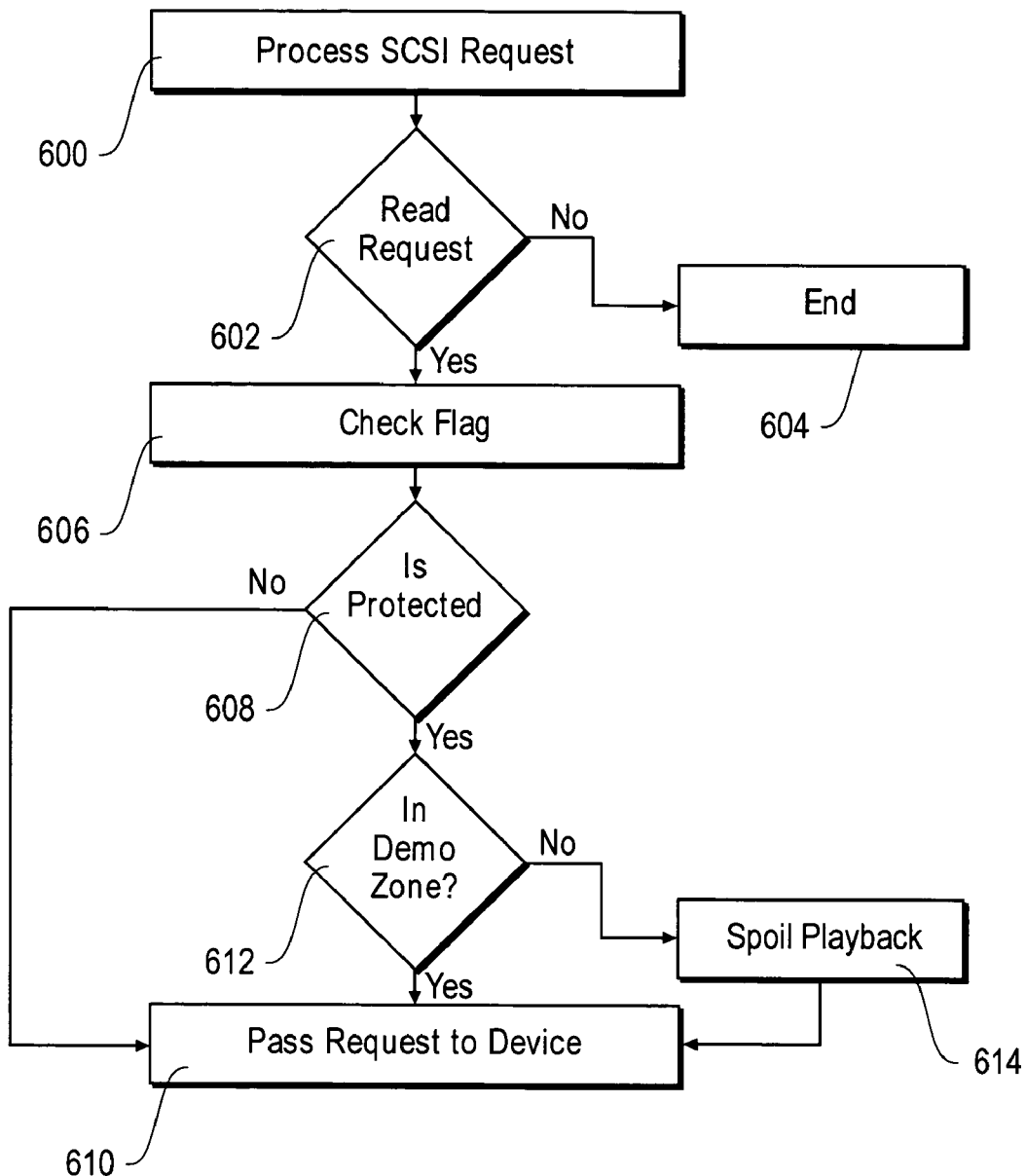
FIG. 6 is a flowchart representing steps of an authentication object and control device according to a first embodiment of the hook driver for monitoring and controlling data transfer from an optical disc.

As shown in FIG. 6, SCSI requests that hitherto would have been processed in the relevant device driver stack 22 are now received by the hook driver 26 in step 600. In step 602, the authentication object 64 of the hook driver 26 enquires whether the request that has been received is a read request. If the answer is no, the hook driver 26 terminates the present process in step 604 and reverts to the process already described in U.S. Ser. No. 11/232,477. However, if the answer is yes the hook driver 26 proceeds to step 606 and checks the "Is protected" flag set in step 508 or 510. The hook driver 26 thus establishes in step 608 whether or not the optical disc 28 in the relevant optical drive 20 is protected. If the answer is no, the hook driver 26 simply forwards the read request directly to the optical drive 20 in step 610, and the read process proceeds as if the hook driver 26 were not present.

If the outcome of step 608 is yes, signifying that the optical disc 28 is protected, the hook driver 26 proceeds to step 612 and the control device 100 of the hook driver 26 enquires whether the portion of the optical disc 28 that is being read is in a demonstration zone, in which normal playback is to be permitted for example for the purposes of evaluation. Such a demonstration zone may comprise, for example, a predetermined quantity and location of each or any audio track, a selected track or tracks or a particular region of the optical disc 28. If the answer to the question in step 612 is yes, signifying that normal playback is to be permitted, then the read request is passed directly to the optical drive 20 in step 610 as before. If, however, the answer to the question in step 612 is no, indicating that the portion of the optical disc 28 being read is not in a demonstration zone, the hook driver 26 proceeds to step 614 and the control device 100 modifies the SCSI request to block, or more preferably spoil, playback before passing the request to the optical drive 20 in step 610.

Thus, the control device 100 effectively switches on and off a blocking or spoiling function of the hook driver 26, according to whether or not the portion of the optical disc 28 being read is in a demonstration zone. This function may simply block reading of the optical disc but, in a preferred embodiment of the invention shown here, the function is a spoiling function as described below.

Figure 7:
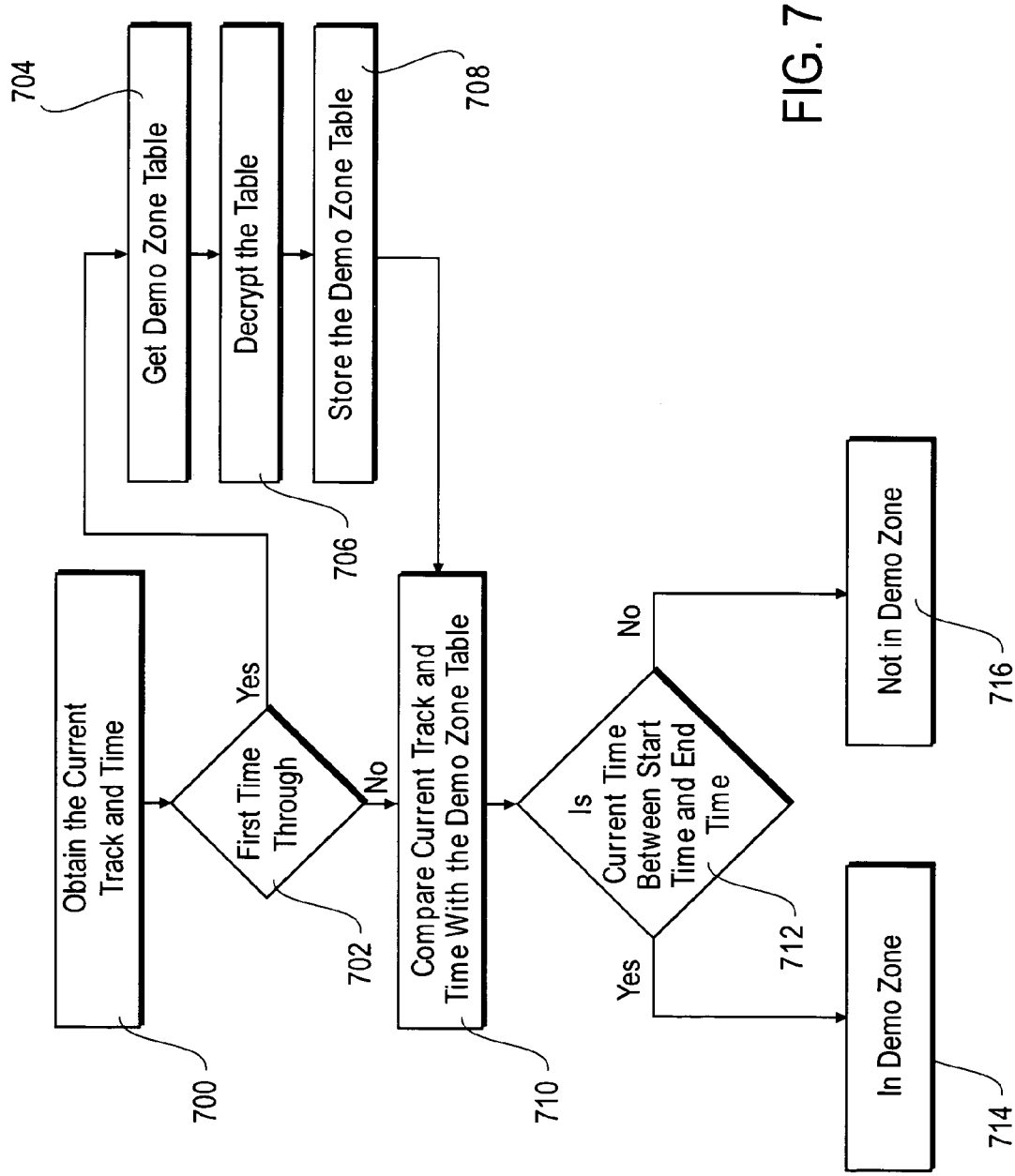
FIGS. 7 to 9 are flowcharts representing steps in respective subroutines of FIG. 6.

FIG. 7 shows the steps involved in the subroutine 612 of FIG. 6 for determining whether the region of the optical disc 28 being read is in a demonstration zone. In step 700, the hook driver 26, more especially the control device 100 of the hook driver 26, obtains from the SCSI request the details of the current track being accessed on the optical disc 28 and the track time elapsed. Next, in step 702, the hook driver 26 enquires whether this is the first occasion of reading the disc 28. If the answer is no, the hook driver proceeds straight to step 710, which will be described below. If the answer is yes, the hook driver 26 proceeds to step 704 and requests and obtains from the optical drive 20 an encrypted table, which is on the optical disc 28 and which contains start and end times for the or each demonstration zone on the optical disc 28. The table is stored on the optical disc 28 in encrypted form in order to avoid tampering. The hook driver 26 decrypts the table in step 706 and stores it in a temporary memory in the control device 100 of the hook driver 26 in step 708, and then proceeds to step 710. In step 710, the hook driver 26 compares the current track and track time elapsed with the start and end times from the decrypted table, and enquires in step 712 whether the region of the optical disc 28 currently being read is between the start time and the end time of a respective demonstration zone. If the answer is yes, the hook driver 26 proceeds to step 714 and indicates that the region being read is within a demonstration zone; whereas if the answer is no the hook driver 26 proceeds to step 716 and indicates that the region being read is not within a demonstration zone.

Figure 8:
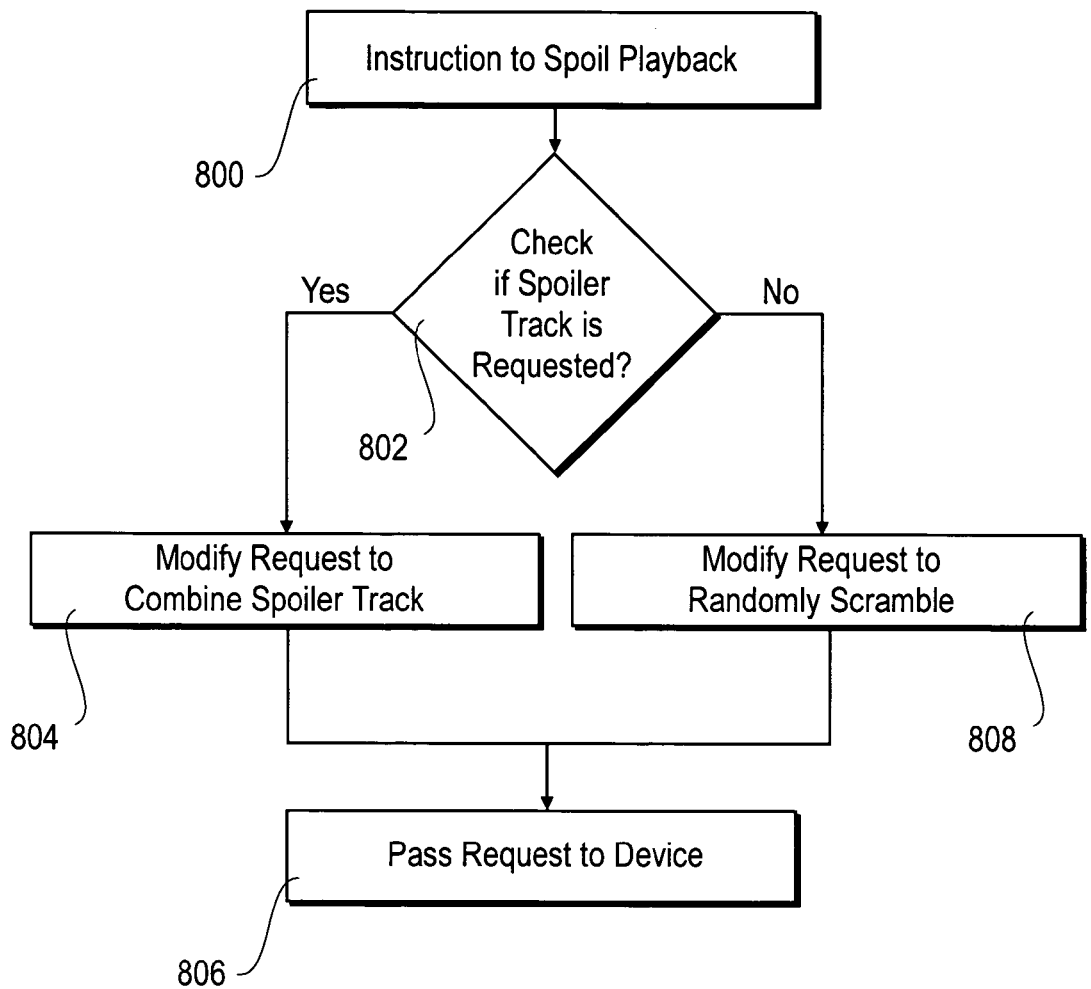

FIG. 8 shows the steps involved in the subroutine 614 of FIG. 6 for spoiling playback of the optical disc 28 in the event that the outcome of the inquiry of step 612 indicates that the region currently being read is not in a demonstration zone. Firstly, in step 800 the control device 100 of the hook driver 26 issues an instruction that playback is to be blocked or spoiled, in this instance spoiled. The hook driver proceeds to step 802 and checks the optical disc 28 by way of the optical drive 20 to establish the manner in which playback is to be spoiled. In the present instance, the hook driver 26 enquires whether a spoiler track is to be added as an overlay to the existing audio track on the CD-ROM 28. For example, such a spoiler track may contain a simple audio bleep or a message saying, "This is a copied disc". If the answer to the question of step 802 is yes, the hook driver proceeds to step 804 and modifies the original SCSI request to combine the spoiler track with the request, before passing the modified request to the optical drive 20 in step 806. The output in this instance would include both the original soundtrack and the overlay. If, on the other hand, the answer to the question in step 802 is no, indicating that a spoiler track is not to be added, the hook driver 26 proceeds to step 808 and modifies the SCSI request in order randomly to scramble the current section of the CD-ROM 28 in playback, before passing the request to the optical drive 20 in step 806.

Figure 9:
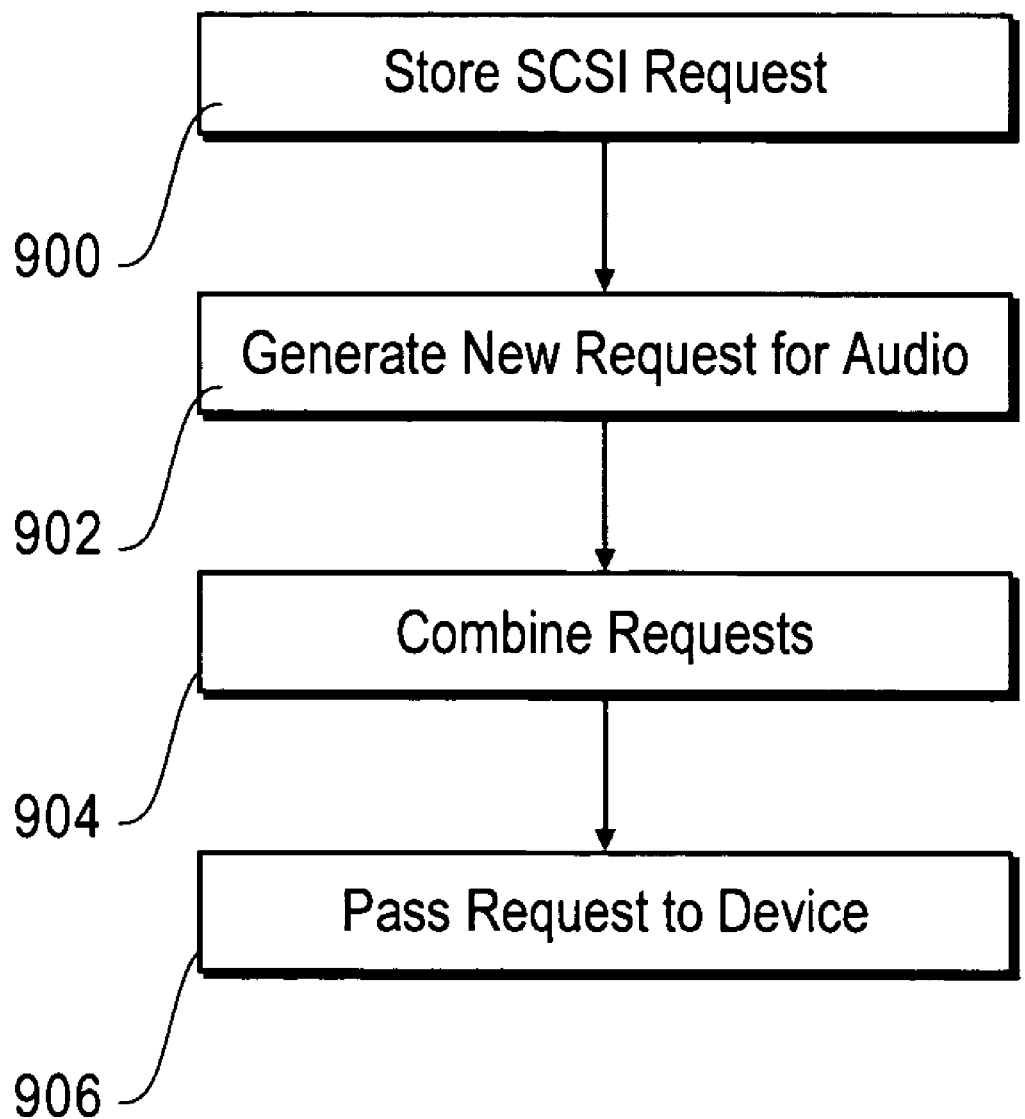

The subroutine of step 804 for combining a spoiler track with the existing section audio track is illustrated in FIG. 9, and commences with step 900 in which the hook driver 26 temporarily stores the SCSI request within the temporary memory in the control device 100. The hook driver 26 proceeds to step 902 and generates a new request for audio playback, in which the track to be played is a spoiler track also stored on the CD-ROM 28. Having received the new request, the hook driver 26 passes to step 904 and combines the stored SCSI request with the new request just received, and then passes both requests to the optical drive 20 in step 906. The result is playback of the combined audio track and spoiler track, which ensures that the quality of reproduction is reduced and obscured but not to the extent that the original cannot be heard at all.

By way of example, in the case of an original CD-ROM 28 having four audio tracks as shown in FIG. 10*a*, the demonstration zones might comprise the first 30 seconds of each track as shown in FIG. 10*b*. In this instance, the demonstration zone within each track could be played normally while the remaining section of each track could be spoiled by scrambling the signal, and the table stored in the memory 14, when decrypted, would look like Table 1 below:

TABLE 1

| Track | Start of playable block | End of playable block | Scramble or Spoil |
| --- | --- | --- | --- |
| 1 | 0 | 30 | Scramble |
| 2 | 200 | 230 | Scramble |
| 3 | 400 | 430 | Scramble |
| 4 | 600 | 630 | Scramble |

Figure 10C:
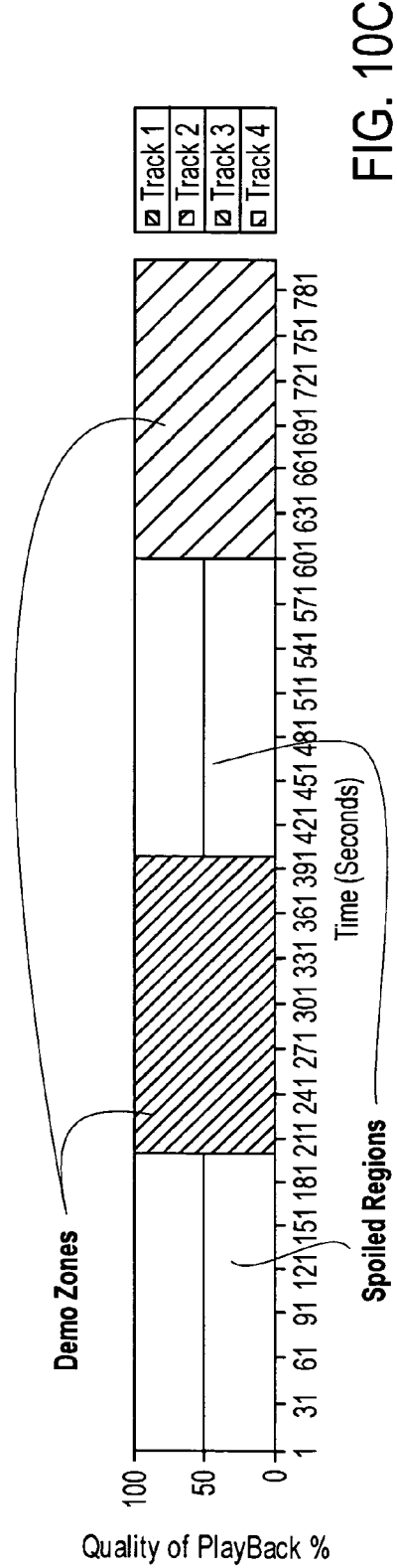

In an alternative embodiment, the demonstration zones might comprise the second and fourth tracks of the CD-ROM 28 as shown in FIG. 10*c*, and the playback of the first and third tracks would be spoiled by scrambling the signal. In this instance, the table obtained from the memory 14 for determining the demonstration zone start and end times, when decrypted, would like Table 2 below:

TABLE 2

| Track | Start of playable block | End of playable block | Scramble or Spoil |
| --- | --- | --- | --- |
| 1 | 0 | 0 | Scramble |
| 2 | 200 | 400 | Scramble |
| 3 | 400 | 400 | Scramble |
| 4 | 600 | 800 | Scramble |

Figure 10D:
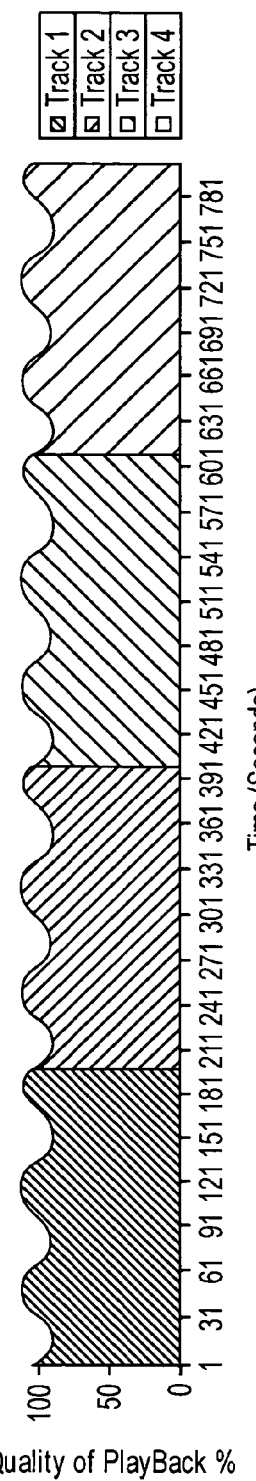

In a further embodiment, as shown in FIG. 10*d*, the demonstration zone(s) might comprise all four tracks but the playback would be spoiled by the addition of a spoiler track so as to reduce the quality of the sound in playback. In this instance, the table obtained from the memory 14, when decrypted, would look like Table 3 below:

TABLE 3

| Track | Start of playable block | End of playable block | Scramble or Spoil |
| --- | --- | --- | --- |
| 1 | 0 | 400 | Spoil |
| 2 | 200 | 400 | Spoil |
| 3 | 400 | 600 | Spoil |
| 4 | 600 | 800 | Spoil |

It is to be appreciated that the above techniques can be employed individually or they can combined so as to play back certain audio tracks or sections of the tracks on the CD-ROM 28 normally while spoiling the remaining regions of the tracks selectively by scrambling or by the addition of a spoiler track.

In the situation where the optical disc 28 in the optical drive 20 is a DVD instead of a CD-ROM, the hook driver 26 according to the invention first establishes this fact, as already described with reference to FIG. 5, and checks whether the DVD is protected and whether a demonstration zone is being read, as described with reference to FIG. 6. For this purpose, the hook driver 26, in step 606, checks the "Is protected" flag set in step 508 or 510, and establishes in step 608 whether the DVD is protected or not. If the answer is no, the hook driver 26 simply forwards the read request directly to the optical drive 20 in step 610, and the processing of the video information proceeds normally and the video image will be displayed as if the hook driver 26 were not present. However, if the outcome of step 608 is yes, signifying that the DVD is protected, the hook driver 26 proceeds to step 612 and employs a variation of the subroutine described with reference to FIG. 7 in order to establish whether a demonstration zone is currently being read. Again, if the answer is yes, the hook driver 26 passes the read request to the optical drive 20 in step 610 as before. However, if the answer to the question in step 612 is no, the hook driver 26 proceeds to step 614 and follows a variation of the subroutine described with reference to FIG. 8 in order to spoil playback by replacing the subtitles of the video stream on the DVD with an image which is built from the original image but which has been spoiled in order to reduce the quality of playback. Subsequently, the hook driver 26 passes the request to the associated optical drive 20 in step 610 as before. These variations to the subroutines of steps 612, 614 will now be described with respect to FIGS. 11 to 15.

Figure 11:
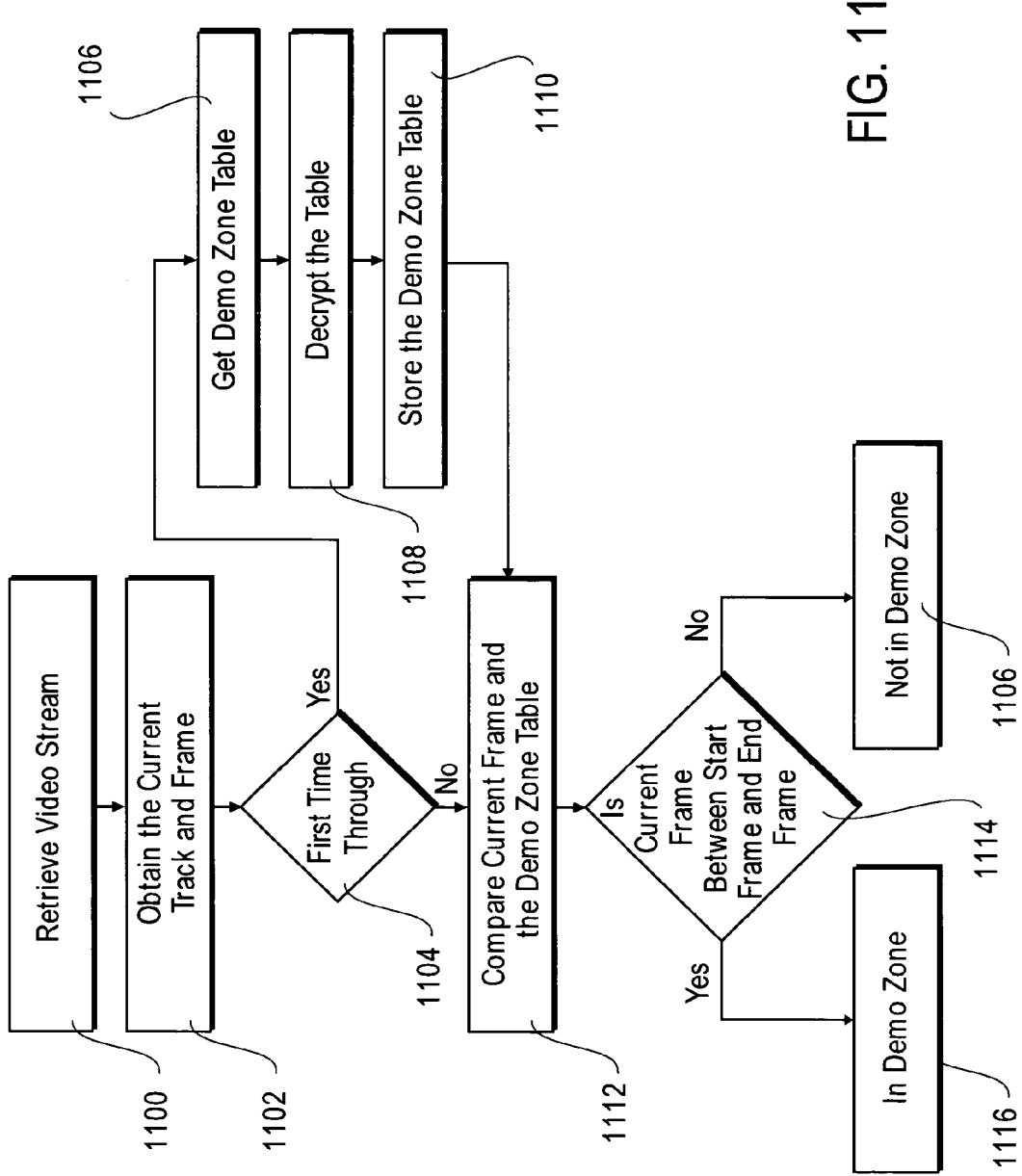
FIG. 11 is a flowchart representing steps of an authentication object and control device according to a second embodiment of the hook driver for monitoring and controlling data transfer from an optical disc.

Referring firstly to FIG. 11, the subroutine of step 612 will be described for the case where the optical disc 28 is a DVD. In step 1100 the hook driver 26 retrieves the video stream from the DVD and in step 1102, the hook driver 26, more especially the control device 100 of the hook driver 26, obtains from the SCSI request the details of the current track and frame being accessed on the optical disc 28. Next, in step 1104, the hook driver 26 enquires whether this is the first occasion of reading the disc 28. If the answer is no, the hook driver proceeds straight to step 1112, which will be described below. If the answer is yes, the hook driver 26 proceeds to step 1106 and requests and obtains from the optical drive 20 an encrypted table, which is on the optical disc 28 and which contains start and end frames for the or each demonstration zone of each track on the optical disc 28. The table is stored on the optical disc 28 in encrypted form in order to avoid tampering. The hook driver 26 decrypts the table in step 1108 and stores it in the temporary memory in the control device 100 of the hook driver 26 in step 1110, and proceeds to step 1112. In step 1112, the hook driver 26 compares the current track and frame with the start and end frames for that track from the decrypted table, and enquires in step 1114 whether the region of the optical disc 28 currently being read is between the start frame and the end frame of a respective demonstration zone. If the answer is yes, the hook driver 26 proceeds to step 1116 and indicates that the region being read is within a demonstration zone; whereas if the answer is no the hook driver 26 proceeds to step 1118 and indicates that the region being read is not within a demonstration zone.

Figure 12:
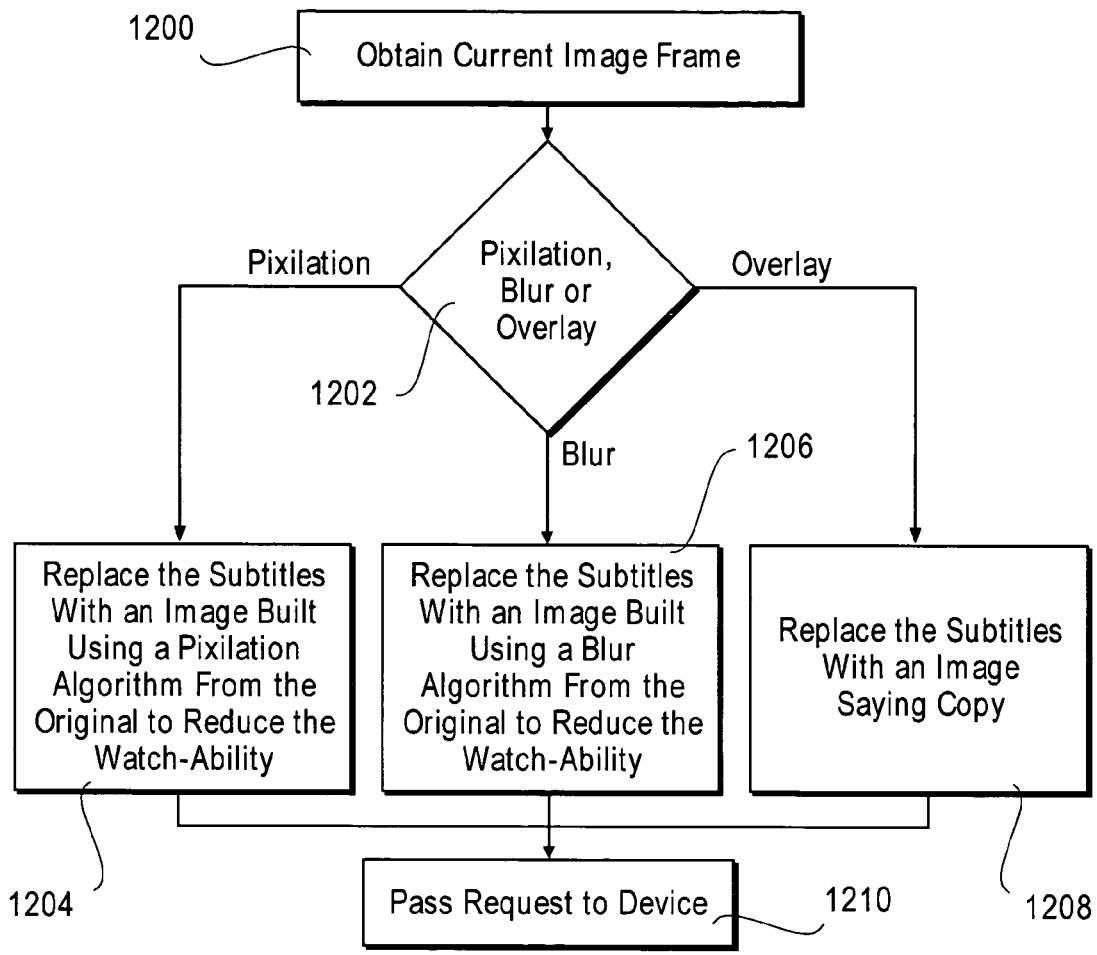
FIG. 12 is a flow chart representing steps in a subroutine in FIG. 11.

The basic steps of the subroutine performed in step 614 are shown in FIG. 12 and commence with step 1200, in which the hook driver 26 obtains the current image frame from the video stream. In step 1202, the hook driver 26 checks the DVD 28 by way of the optical drive 20 to enquire what form of spoiling is required in the present instance. According to the outcome of the inquiry in step 1202, the hook driver 26 proceeds to a respective one of the subroutines 1204, 1206 or 1208 and performs the selected subroutine for spoiling the frame before passing the SCSI request to the optical drive 20 in step 1210 to display the current spoiled frame. The subroutine represented in step 1204 applies a pixilation algorithm to the original frame in order to average the pixel values and remove a substantial quantity of the detail and thus reduce the picture quality. The subroutine represented in step 1206 applies a different algorithm to the pixels of the current video frame in order to blur the image and thus reduce the picture quality. The subroutine represented in step 1208 combines an overlay image with the original image to reduce picture quality. For example, the overlay image may include lettering or wording, such as the letters for the word "COPY".

The respective subroutines 1204, 1206, 1208 will now be described with reference to FIGS. 13 to 15.

Figure 13:
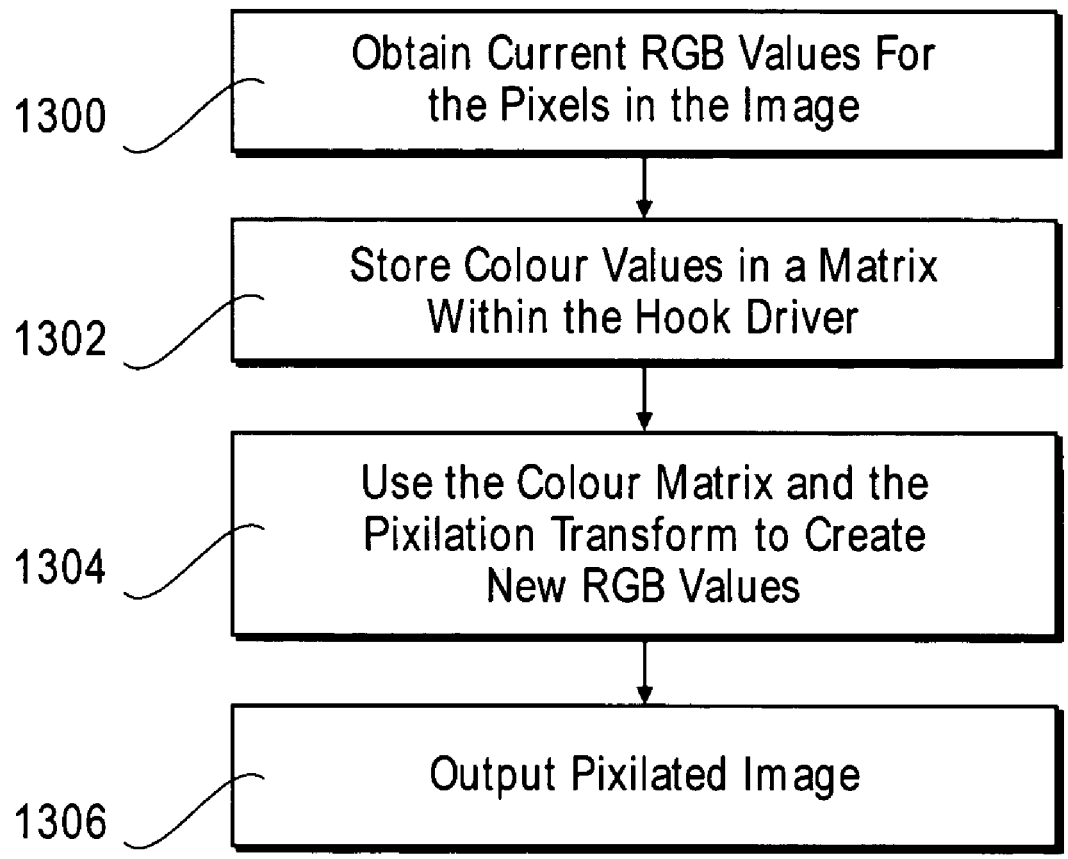
FIGS. 13 to 15 are flowcharts representing steps in respective subroutines in FIG. 12.

Referring first to FIG. 13, the hook driver 26 commences in step 1300 by obtaining the red, green and blue pixel values for all of the pixels in the current image frame. In step 1302, the hook driver 26 separates the pixel values according to channel, and stores in a matrix within the temporary memory in the control device 100 of the hook driver 26 the values for each of the red, green and blue channels. Next, in step 1304, the hook driver 26 transforms the original pixel values for each of the channels by applying the following transform to each block of nine pixel values to produce an average pixel value for the whole block:

$$[RGB_{i'j'}] = 1/9 \sum_{ij=(0,0)}^{ij=(2,2)} [RGB_{ij}] \text{ for } i = 0, 1, 2 \text{ and } j = 0, 1, 2$$

where R, G and B represent the red, green and blue pixel values, respectively.

By way of example, if the red channel values for a nine pixel block are as shown in Table 4 below:

TABLE 4

| red value (0,0) | red value (1,0) | red value (2,0) |
| red value (0,1) | red value (1,1) | red value (2,1) |
| red value (0,2) | red value (1,2) | red value (2,2) | the hook driver 26 sums all nine values and then divides the total by nine and substitutes the resulting value for the whole block to give an average value for all the pixels. The block of nine pixels is thus transformed as shown in FIG. 17a from the view shown on the left hand side of the figure to the view shown on the right hand side of the figure, and the resulting image frame lacks a considerable amount of fine detail.

The same transformation is then applied to the entire image. When the hook driver 26 has applied the pixilation transform to all the blocks of nine pixel values according to step 1304, the hook driver 26 outputs the information for the pixilated image in step 1306. There may be some areas at the edges of the image that include less than a block of nine pixels and that therefore remain unaffected by the transformation. However, this does not significantly alter the overall effect of the transformation.

Figure 14:
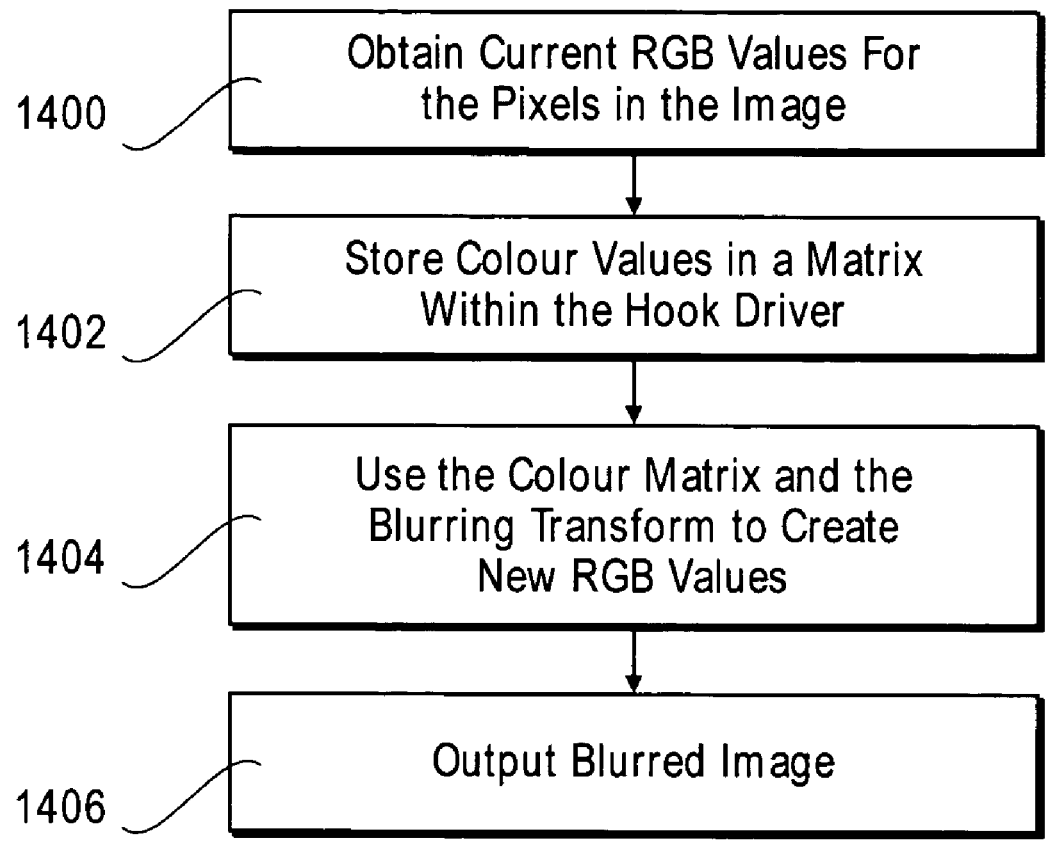

An alternative possibility is to blur the original image frame according to the subroutine of step 1206 in FIG. 12, and this subroutine is illustrated in FIG. 14. The subroutine of FIG. 14 commences with step 1400, in which the hook driver 26 obtains the current pixel values for each of the red, green and blue channels for the entire image. As in the subroutine of FIG. 13, the hook driver 26 then stores the pixel values for each of the red, green and blue channels in step 1402. In step 1404, the hook driver 26 divides the pixel values into blocks of nine and applies the following transform to each block of nine pixels in order to blur the overall image:

$$[RGB_{i'j'}] = W_{ij}/97 \sum_{ij=(0,0)}^{ij=(2,2)} [RGB_{ij}] \text{ for } i = 0, 1, 2 \text{ and } j = 0, 1, 2$$

where R, G, B represent the red, green and blue pixel values, respectively, as before, and W represents a weighting value applied to each pixel.

By way of example, if the red values for a block of nine pixels are as shown in Table 4 above and weightings are given to the different pixel positions as shown in Table 5 below:

TABLE 5

| 6 | 12 | 6 |
| 12 | 25 | 12 |
| 6 | 12 | 6 | then the transform will sum the pixel values, divide the total by an amount determined by the sum of the weighting values (i.e. 97 in the present example) and weight the outcome to produce new values for each red pixel value, as shown in Table 6 below:

TABLE 6

| 6 * weighted average red value | 12 * weighted average red value | 6 * weighted average red value |
| 12 * weighted average red value | 25 * weighted average red value | 12 * weighted average red value |
| 6 * weighted average red value | 12 * weighted average red value | 6 * weighted average red value |

The result of this transform is that the block of nine red pixels is transformed as shown in FIG. 17b from the display shown on the left hand side of the figure to the display shown on the right hand side of the figure, and the resulting image frame is blurred.

The same transformation is then applied to the entire image, and, in step 1406, the hook driver 26 passes the information to the optical drive 20 to output a blurred image on the display 18 of the PC 10. As before, there may be some areas at the edges of the image that include less than a block of nine pixels and that therefore remain unaffected by the transformation. However, this does not significantly alter the overall effect of the transformation.

In both the cases described with reference to FIGS. 13 and 14, it is, of course, also possible to employ larger blocks, and in the case of the blurring described with reference to FIG. 14 it is possible to employ different weightings.

Figure 15:
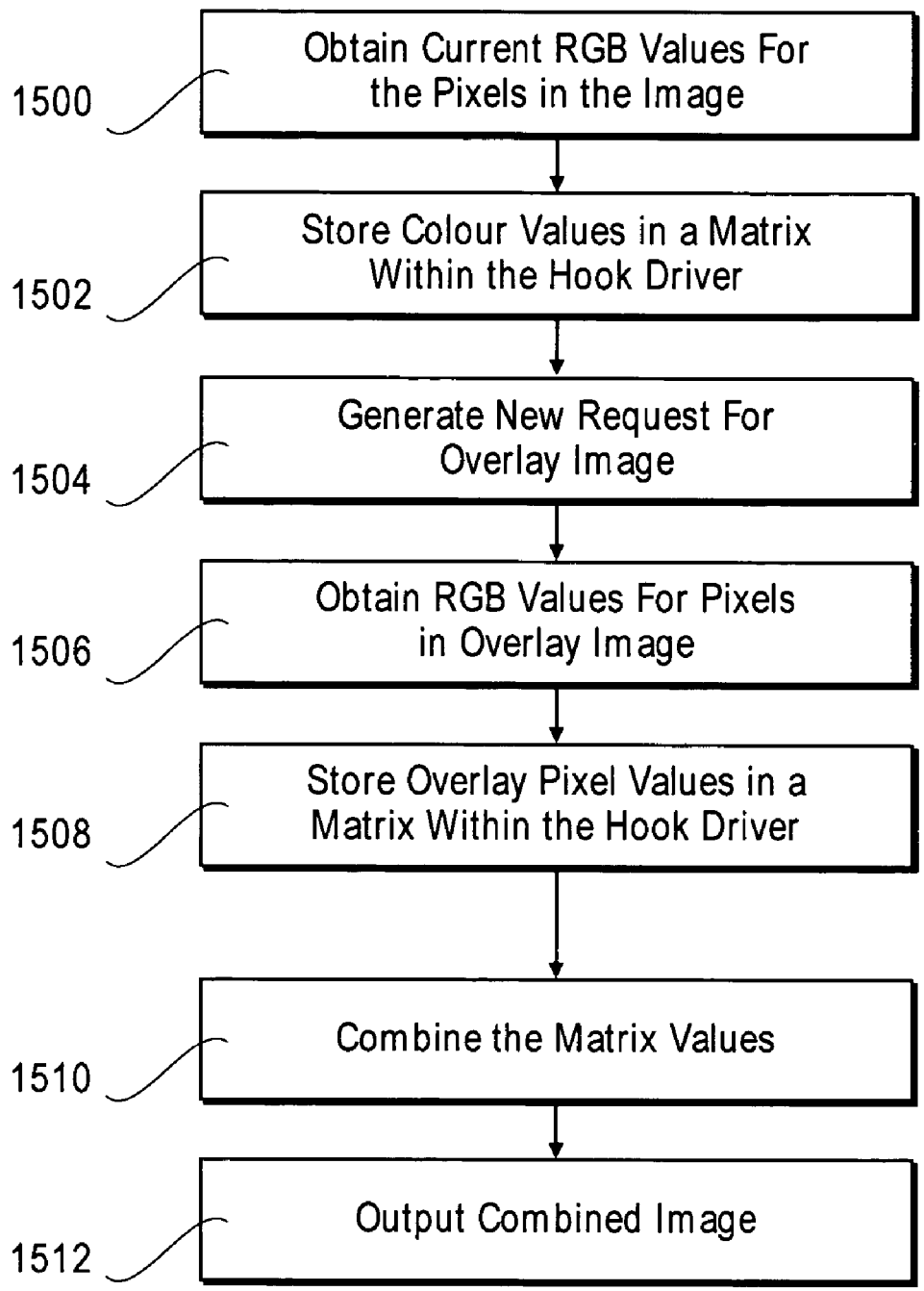

The third subroutine 1208 of FIG. 12 is represented in FIG. 15 and commences in step 1500 with the hook driver 26 obtaining the current values for all the pixels in the red, green and blue channels in the present image frame as before. In step 1502, the hook driver 26 stores these values in a matrix within the temporary memory in the control device 100 of the hook driver 26 before proceeding to step 1504. In step 1504, the hook driver 26 generates a new request for video playback in the form of an overlay image, which is recorded on the DVD 28 elsewhere than the main video stream and which, in the present instance, comprises a simple image showing the word "COPY" only. On receipt of the new video request, the hook driver 26 obtains the RGB pixel values for the overlay image from the DVD in step 1506 and stores them within the temporary memory in step 1508. The hook driver 26 proceeds to step 1510 and sums the matrices to combine the pixel values for the overlay image with the pixel values for the original image, which effectively blacks out the pixels of the original image frame that fall in locations where the lettering of the overlay image exist. The hook driver 26 then passes the pixel values for the new combined image to the optical drive 20 in step 1512.

Figure 16A:
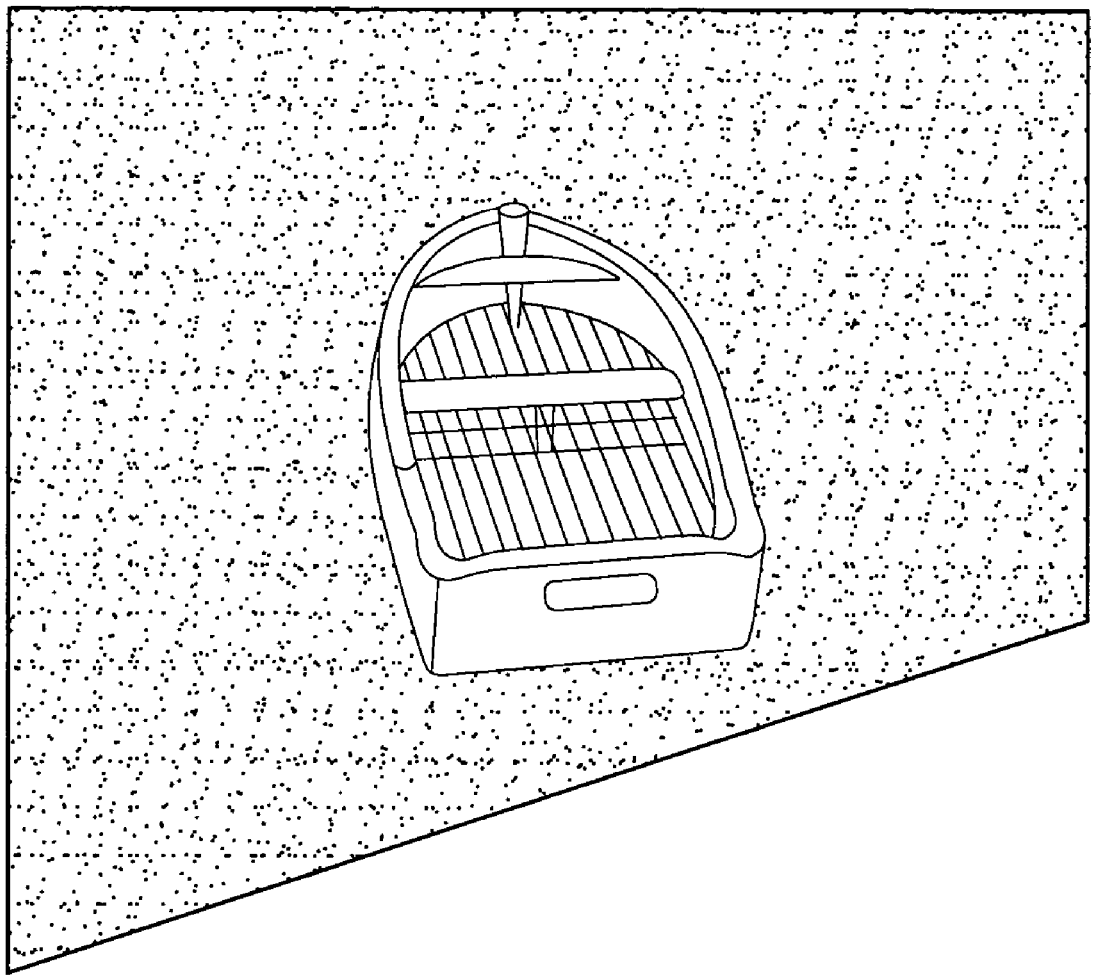
Figure 16B:
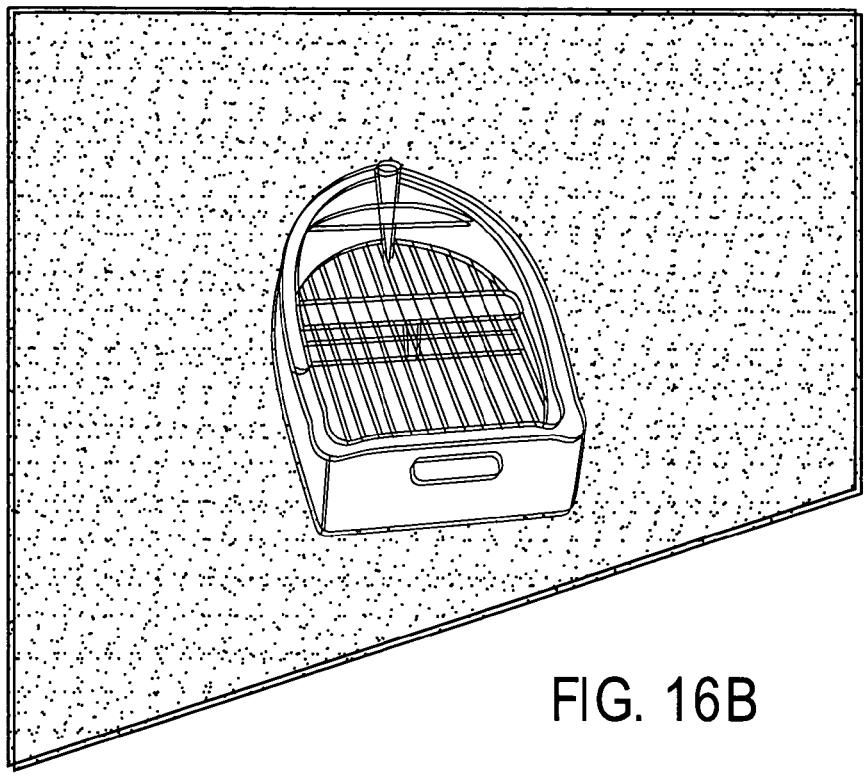
Figure 16C:
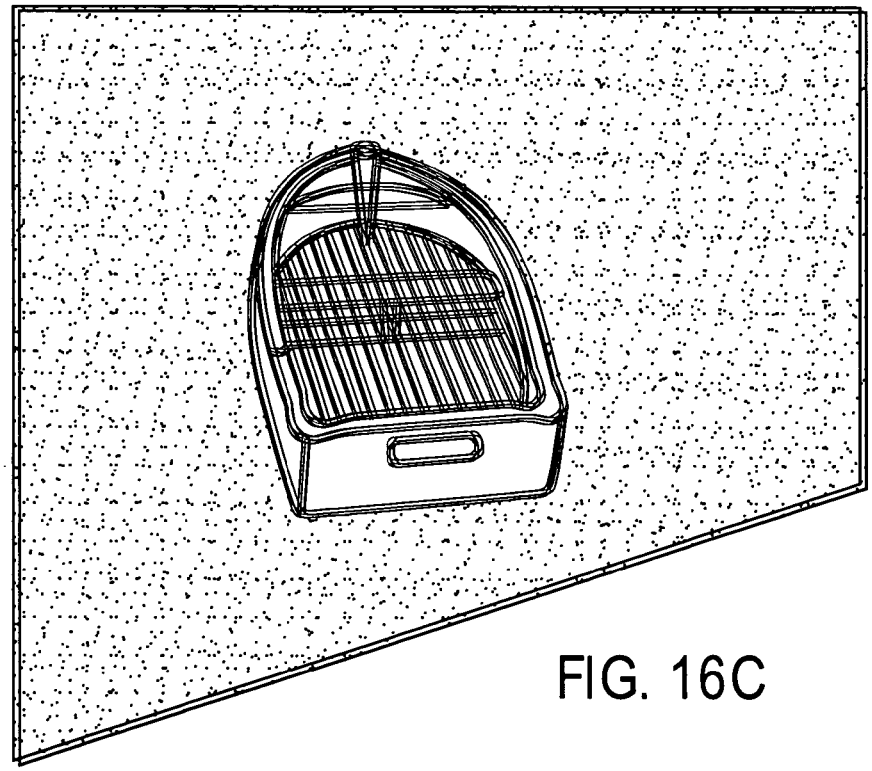

An example of the effects of the present invention may be seen in FIGS. 16a to 16d, in which FIG. 16a shows an original image frame before any spoiling or transformation has occurred. FIG. 16b shows the same image frame after spoiling by the application of the pixilation algorithm represented in step 1204 of FIG. 12, and contains noticeably less detail than the original image frame of FIG. 16a. FIG. 16c represents the original image frame after application of the blurring algorithm of step 1206, and is evidently of reduced picture quality by comparison with the original image frame of FIG. 16a. FIG. 16d represents the original image frame after overlay with an additional image using the subroutine of step 1208 of FIG. 12. Again, the picture quality is evidently reduced.

As in the case of the spoiling of an audio track when playback is not in a demonstration zone, the techniques described for video spoiling can be employed individually as they have been described, or they can be combined.

I claim:

1. A computer system comprising:
a media drive configured to receive a computer readable medium storing data; and
a processor executing a hook driver, wherein said hook driver accesses a device-driver stack for said media drive, detects insertion of the computer readable medium in said media drive, monitors accessing of data on said computer readable medium, establishes a location of at least one demonstration zone on said computer readable medium, determines whether a data region currently being accessed is in said demonstration zone, and modifies playback of data in dependence upon the outcome of said determination.

2. The computer system according to claim 1, wherein the hook driver detects a copy protection indicator on the computer readable medium and activates a control device in response to such detection.

3. The computer system according to claim 1, wherein the hook driver reads and decrypts an encrypted table containing information concerning said location of said at least one demonstration zone.

4. The computer system according to claim 3, wherein said hook driver compares said data region currently being accessed with said demonstration zone information for determining whether said data is in said demonstration zone.

5. The computer system according to claim 3, wherein said hook driver compares a current audio track and a track time elapsed with said demonstration zone information.

6. The computer system according to claim 3, wherein said hook driver compares a current video track and a current video frame with said demonstration zone information.

7. The computer system according to claim 1, wherein said hook driver blocks playback of data in dependence upon the outcome of said determination.

8. The computer system according to claim 1, wherein said hook driver reduces quality of playback in dependence upon the outcome of said determination.

9. The computer system according to claim 1, wherein said hook driver spoils playback in dependence upon the outcome of said determination.

10. The computer system according to claim 8, wherein said hook driver combines a spoiler track with data currently being accessed.

11. The computer system according to claim 8, wherein said hook driver randomly scrambles data currently being accessed.

12. The computer system according to claim 8, wherein said hook driver applies one of a pixilation algorithm and a blurring algorithm to an original frame of said data currently being accessed.

13. The computer system according to claim 8, wherein said hook driver applies an overlay image to an original frame of said data currently being accessed.

14. A method for controlling access to data on a computer readable medium, comprising:
 accessing a device-driver stack for a media drive;
 detecting insertion of a computer readable medium in said media drive;
 monitoring accessing of data on said computer readable medium;
 establishing a location of at least one demonstration zone on said computer readable medium;
 determining whether a data region currently being accessed is in said demonstration zone; and
 modifying playback of data in dependence upon the outcome of said determination.

15. The method according to claim 14 further comprising detecting a copy protection indicator on said computer readable medium and implementing said steps of establishing, determining and modifying in response to such detection.

16. The method according to claim 14 further comprising reading and decrypting an encrypted table containing information concerning said location of said at least one demonstration zone.

17. The method according to claim 16 further comprising comparing said data region with said demonstration zone information for determining whether said data region is in said demonstration zone.

18. The method according to claim 16 further comprising comparing a current audio track and a track time elapsed with said demonstration zone information.

19. The method according to claim 16 further comprising comparing a current video track and a current video frame with said demonstration zone information.

20. The method according to claim 14 in which said step of modifying comprises blocking playback of data.

21. The method according to claim 14 in which said step of modifying comprises reducing quality of playback.

22. The method according to claim 14 in which said step of modifying comprises spoiling playback.

23. The method according to claim 22 in which said step of spoiling comprises combining a spoiler track with said data currently being accessed.

24. The method according to claim 22 in which said step of spoiling comprises randomly scrambling said data currently being accessed.

25. The method according to claim 22 in which said step of spoiling comprises applying one of a pixilation algorithm and a blurring algorithm to an original frame of said data currently being accessed.

26. The method according to claim 22 in which said step of spoiling comprises applying an overlay image to an original frame of said data currently being accessed.

* * * * *